United States Patent
Menzel et al.

(10) Patent No.: US 6,499,728 B2
(45) Date of Patent: Dec. 31, 2002

(54) COOLING TOWER

(75) Inventors: Knut Menzel, Essen (DE); Michael Kaatz, Ratingen (DE)

(73) Assignee: Balcke-Durr Energietechnik GmbH (DE)

(*) Notice: Subject to any disclaimer, the term of this patent is extended or adjusted under 35 U.S.C. 154(b) by 0 days.

(21) Appl. No.: 09/891,813

(22) Filed: Jun. 26, 2001

(65) Prior Publication Data
US 2002/0047219 A1 Apr. 25, 2002

(30) Foreign Application Priority Data
Jun. 28, 2000 (EP) .......................... 00113621

(51) Int. Cl.[7] .................................. B01F 3/04
(52) U.S. Cl. ............. 261/109; 261/111; 261/DIG. 11; 165/900
(58) Field of Search .................. 261/28, 30, 96, 261/102, 105, 109, 111, DIG. 11; 165/900

(56) References Cited

U.S. PATENT DOCUMENTS

| | | | | |
|---|---|---|---|---|
| 2,394,755 A | * | 2/1946 | De Flon | 261/109 |
| 2,915,302 A | * | 12/1959 | Jacir | 261/109 |
| 3,923,935 A | * | 12/1975 | Cates | 261/DIG. 11 |
| 4,367,183 A | * | 1/1983 | Carbonaro | 261/109 |
| 4,514,344 A | * | 4/1985 | Ruscheweyh | 261/109 |
| 4,893,669 A | | 1/1990 | Kashiwada et al. | |

FOREIGN PATENT DOCUMENTS

DE 196 11 627 10/1997

* cited by examiner

Primary Examiner—C. Scott Bushey
(74) Attorney, Agent, or Firm—Cantor Colburn LLP

(57) ABSTRACT

A cooling tower is provided including a cooling chamber with a bottom-to-top cooling air flow and a water injection system having spray nozzles horizontally distributed within the cooling chamber. A first air intake and a second air intake lead into the cooling chamber from below and, respectively, laterally from above the water injection system. The second air intake is implemented by a pipe, protruding into the interior of the cooling chamber, the pipe having at least two stages, beginning with a first stage next to a wall of the cooling chamber, the stages having progressively reduced flow cross-sections.

9 Claims, 2 Drawing Sheets

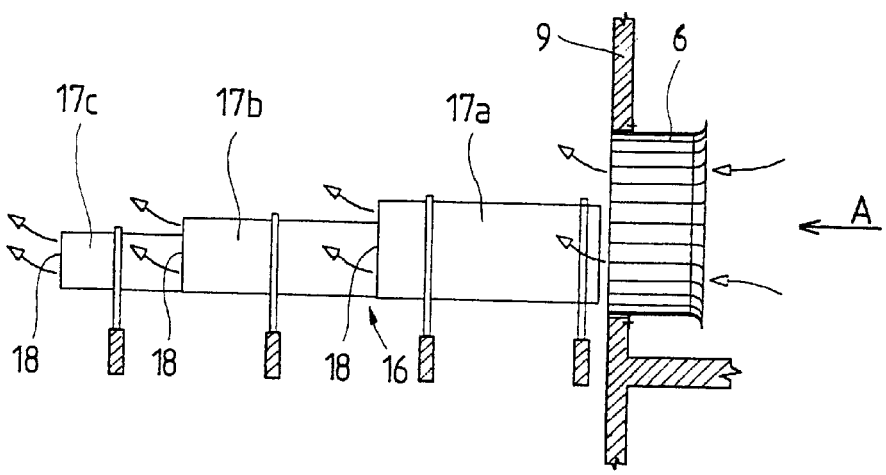
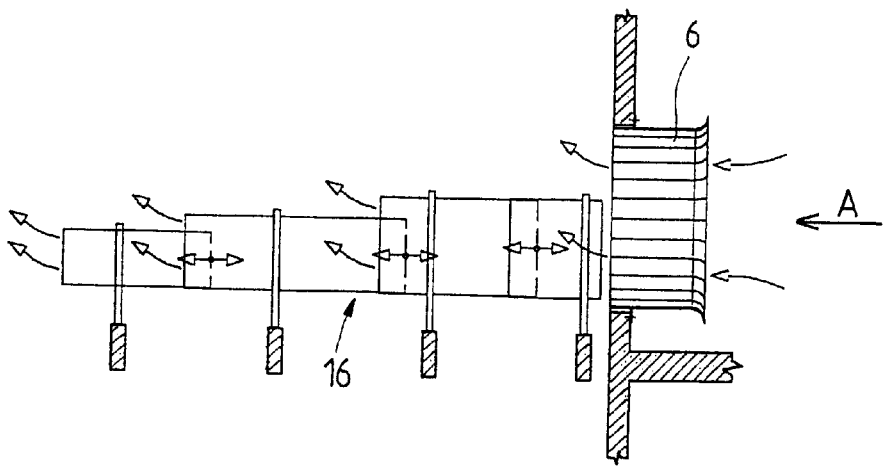
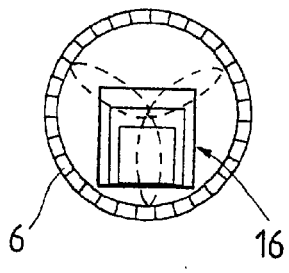
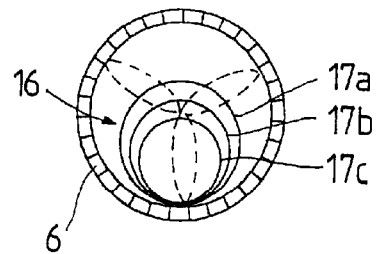
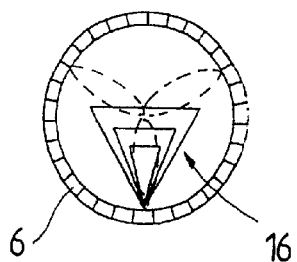

COOLING TOWER

FIELD OF THE INVENTION

This invention relates to a cooling tower incorporating a cooling chamber with a bottom-to-top cooling air flow, a water injection system consisting of spray nozzles horizontally distributed within the cooling chamber, as well as a first air intake and a second air intake leading into the cooling chamber from below and, respectively, laterally from above the water injection system.

DESCRIPTION OF THE RELATED ART

A cooling tower of this type, designed as a wet/dry cooling tower, has been described in DE 29 25 462 C3. Laterally extending into the cooling chamber, constituted of the cooling-tower shell, are cylindrical pipes by way of which a secondary air current is directed into the cooling chamber above the trickling units. The air stream exiting from these pipes is collimated which extends the directional effect of the pipes that serve as flow vectorizers. The radial length over which the pipes proper extend is 20 to 40% of the cooling-tower radius. The wet/dry cooling tower described in DE 29 25 462 C3 is of a radially symmetric design and the cylindrical pipes are evenly distributed over the circular circumference of the cooling tower. This provides for a uniform cross-sectional mixing pattern throughout the flow in the cooling tower. Any other cooling-tower design, especially one deviating from a circular configuration, could be expected to result in a significantly less effective mixing pattern at least in some areas of the cooling chamber while requiring a longer mixing path which in turn would necessitate a greater structural height of the cooling tower.

SUMMARY OF THE INVENTION

The invention provides a cooling-tower design with a lateral cooling-air intake, combining a good cross-sectional mixing pattern throughout the coolant flow with the advantages of a low structural height.

As the solution by which this is to be accomplished in a cooling tower of the type first above mentioned, the second air intake is in the form of a two-stage or multi-stage pipe that extends into the cooling chamber and whose stages, starting with the first stage next to the wall of the cooling chamber, feature decremental flow diameters. Preferably, the free outlet end of each stage of the pipe is equal to the flow diameter of that stage minus the flow diameter of the next following stage.

The multistage design of the pipe that extends deep into the interior of the cooling chamber results in a distribution of the cooling air, entering through this pipe, over the cross-sectional area of the cooling chamber. From each of the individual stages only a partial amount out of the total volume of cooling air fed to the pipe concerned will exit so that a distribution of the cooling air is already obtained as it is fed in, resulting in a better overall mixing over the entire cross section of the cooling chamber above the water injection system. Due to the uniformity already obtained at the exit points of the cooling air and the associated improvement in the mixing pattern within a shorter mixing path, the structural height of the cooling tower according to this invention can be reduced, resulting in lower construction costs while at the same time offering advantages in terms of appearance and municipal planning considerations.

If the auxiliary i.e. secondary air flow to be added to the primary air current, constituted of the cooling air fed in via the first air intake, cannot be generated by natural convection, another feature of this invention provides for the possibility of employing a forced-air blower situated in front of the pipe. This forced-air blower is preferably surrounded by a cylindrical blower enclosure, a first partial flow volume of the cooling air exiting from the blower enclosure enters the first stage of the pipe and a second partial flow volume enters directly into the cooling chamber. In this fashion a partial volume of the secondary, auxiliary air current also moves directly into the interior wall area of the cooling tower where it is mixed with the main flow of the primary air passing through the water injection system.

A further enhancement of the cooling-tower design is characterized by an air heat exchanger situated in front of the second air intake. This air heat exchanger is provided with heat-exchanging surfaces for an indirect heat exchange function.

In another proposed design enhancement, the stages of the pipe are axially adjustable relative to one another. This offers the possibility for the secondary air exiting between the individual pipe stages to be directed into the cross-sectional areas of the cooling tower in controlled fashion, permitting appropriate control of the mix ratio.

BRIEF DESCRIPTION OF THE INVENTION

Design examples of this invention are illustrated in the attached drawings in which FIG.

FIG. 2 depicts the multi-stage pipe, serving to distribute the secondary cooling air in a second design version;

FIG. 3 shows the multi-stage pipe, serving to distribute the secondary cooling air in yet another design version;

FIG. 4 is a view along the plane A indicated in FIGS. 2 and 3;

FIG. 5 is a view corresponding to that in FIG. 4, in this case with a square cross section of the multi-stage pipe; and FIG. 6 is a view corresponding to that in FIG. 4, in this case with a triangular cross section of the multi-stage pipe.

DETAILED DESCRIPTION OF THE PREFERRED EMBODIMENTS

Figure 1:
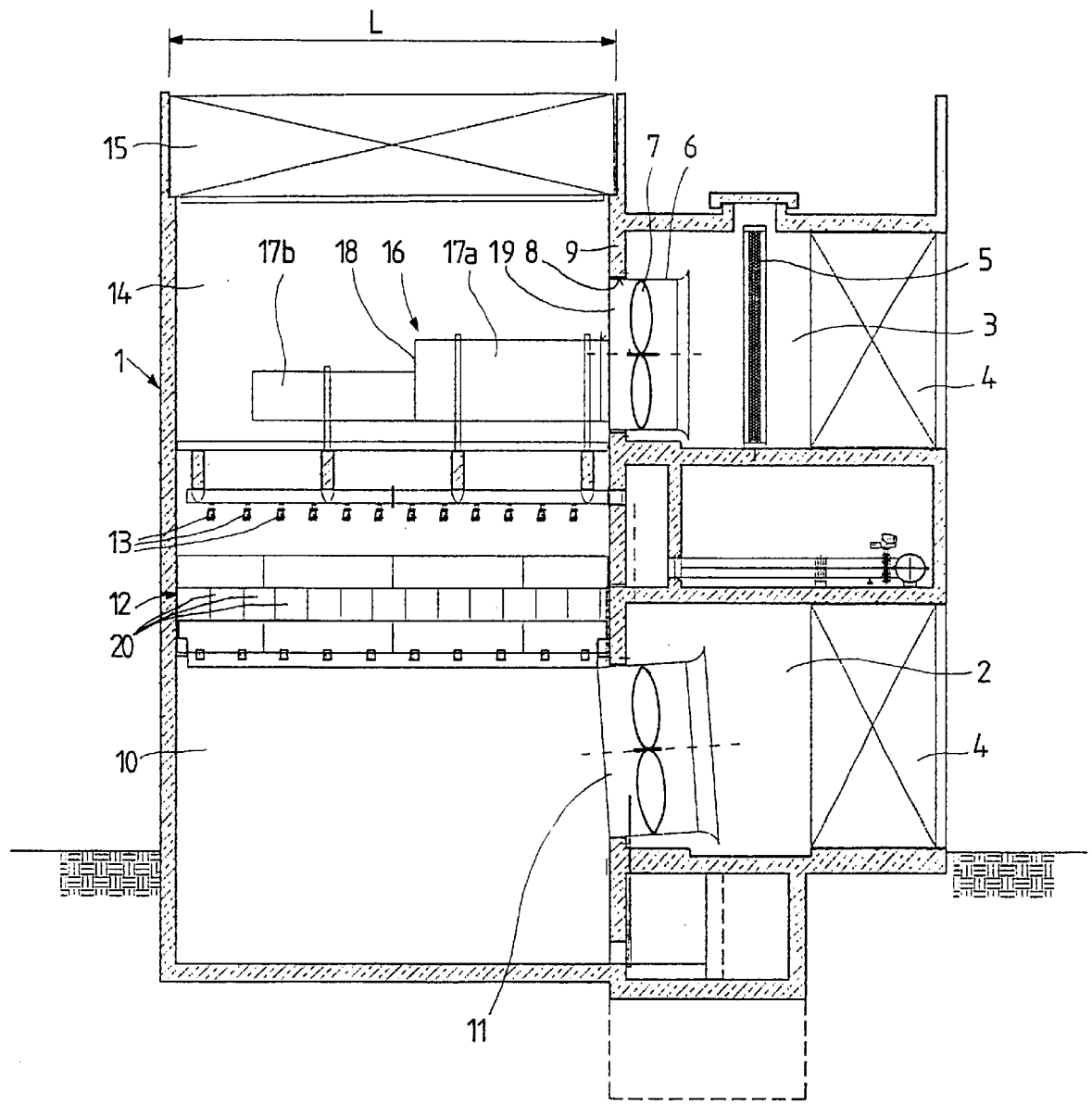
FIG. 1 is a vertical section view of a wet/dry cooling tower fed at two levels with cooling air and incorporating a multi-stage pipe for secondary-air distribution.

FIG. 1 is a cross-sectional illustration of a wet/dry cooling tower with an essentially vertical air flow through a cooling chamber 1 with a rectangular basal surface and two laterally positioned chambers 2 and 3 serving to feed cooling air into the cooling chamber 1. The intake ports of the chambers 2 and 3 are equipped with noise-muffling plates 4. In the upper chamber 3, after having passed the muffling plates 4, the incoming air flows through an air heat exchanger 5 featuring heat-exchange surfaces for an indirect heat exchange. At the end of each chamber 2 and 3, directly in front of the port leading into the cooling chamber 1, an electrically powered forced-air blower 7 is housed in a blower enclosure 6. The blower enclosure 6 is flush-mounted in a corresponding opening 8 in the vertical wall 9 of the cooling chamber 1, so that all of the air current generated by the forced-air blowers 7 passes in a horizontal direction into the interior of the cooling chamber 1.

The cooling chamber 1 is composed of a total of four zones positioned one atop the other. The bottom-most zone is a distribution compartment 10 for the primary air flow entering via the first air intake 11.

The next zone above it is composed of a water injection system 12 with spray nozzles 13 horizontally distributed inside the cooling chamber 1. The spray nozzles 13 produce a fine spray of water which is evenly distributed over the cooling module 20 along the plane of the water injection system 12.

The next zone above that is a mixing compartment 14 which is located on the same level as the chamber 3. The second air intake 19 leads into this mixing compartment 14.

The uppermost zone of the cooling tower is equipped with gates 15 which serve to ensure a balanced exhaust of the moist air into the atmosphere while also reducing noise emission.

According to the invention, the air fed into the mixing compartment 14 via the upper forced-air blower 7 is divided into several partial flow volumes which then mix with the primary air flow rising from the distribution compartment 10. This is accomplished by means of a multi-stage pipe 16, constituting an extension of the upper forced-air blower 7 in the cooling chamber. In the design example per FIG. 1 the pipe 16 is configured in two stages comprised of a first stage 17a with a larger diameter and, following in line with it, a second stage 17b with a smaller diameter. The diameter of the first stage 17a on its part is smaller than the diameter of the blower enclosure 6 of the forced-air blower 7. Thus, beginning with the first stage 17a next to the wall 9, the pipe stages have progressively smaller flow cross-sections. The free exit flow diameter 18 at the end of the first stage 17a of the pipe 16 equals the flow cross-section of this stage 17a minus the flow cross-section of the next following stage 17b. Concurrently, a partial flow volume of the cooling air travels directly from the blower enclosure 6 into the cooling chamber, given that the diameter of the blower enclosure 6 on its part is larger than the diameter of the first stage 17a.

Thus, in the design example per FIG. 1, a total of three partial secondary air-flow volumes are created. The first partial flow volume moves directly from the blower enclosure 6 to the interior of the cooling chamber, the second partial flow volume exits at the end of the first stage 17a, and the third partial flow volume exits at the end of the second stage 17b. Suitable selection of the length of these stages will optimize an even distribution of the partial air flow volumes over the entire horizontal length L of the mixing compartment 14.

In the design example per FIG. 1 the individual pipe stages are in the form of round cylinders as reflected in FIG. 4. However, the cross section of the individual pipe stages may also be square or rectangular as shown in FIG. 5, or triangular as shown in FIG. 6. There is considerable latitude in the selection of the cross-sectional shape of the individual stages, with the partial air flow volume exiting at the transition from one stage into the next being a function of the cross-sectional difference. The larger that cross-sectional difference, the larger the partial air amount transferred at that transition.

In the design example per FIG. 2, the pipe 16 consists of a total of three stages 17a, 17b and 17c so that, in conjunction with the blower enclosure 6 constituting a first stage, there will be a total of four exit flow cross-sections and corresponding partial secondary air-flow volumes.

Finally, FIG. 3 illustrates the possibility of making the individual stages 17a, 17b and 17c axially adjustable relative to one another. Such adjustments can be made by means of suitable electric or hydraulic drives even during operation of the cooling tower, permitting partial secondary air-flow volumes to be directed into specific areas of the cross-sectional flow pattern of the cooling chamber.

What is claimed is:

1. Cooling tower comprising:

a cooling chamber with a bottom-to-top cooling air flow;

a water injection system including a plurality of spray nozzles horizontally distributed within the cooling chamber;

a first air intake leading into the cooling chamber from below the water injection system; and a second air intake leading into the cooling chamber laterally from above the water injection system;

wherein the second air intake is implemented by a pipe protruding into an interior of the cooling chamber, the pipe having at least two stages, beginning with a first stage next to a wall of the cooling chamber, the stages having progressively reduced flow cross-sections.

2. Cooling tower as in claim 1, further comprising a free exit flow cross section at an end of each stage of the pipe equal to a flow cross section of such stage minus a flow cross section of a next following stage.

3. Cooling tower as in claim 1, further comprising a forced-air blower for feeding air into the pipe.

4. Cooling tower as in claim 3, wherein the forced-air blower is surrounded by a cylindrical blower enclosure.

5. Cooling tower as in claim 1, further comprising an air heat exchanger positioned in front of the second air intake.

6. Cooling tower as in claim 1, wherein the at least two stages of the pipe are axially adjustable relative to one another.

7. Cooling tower as in claim 3, wherein the forced-air blower is mounted in front of the first stage of the pipe.

8. Cooling tower as in claim 4, wherein the blower enclosure is of a cylindrical form.

9. Cooling tower as in claim 4, wherein the blower enclosure provides a first partial flow volume of a cooling air flowing from the blower enclosure entering into the first stage of the pipe, and a second partial flow volume flowing directly into the cooling chamber.

* * * * *